US009156542B2

United States Patent
Pitard et al.

(10) Patent No.: US 9,156,542 B2
(45) Date of Patent: Oct. 13, 2015

(54) SYSTEM FOR PILOTING AN AIRCRAFT PROVIDED WITH A PERFORMANCE FUNCTIONS SERVER

(71) Applicant: Airbus Operations (SAS), Toulouse (FR)

(72) Inventors: Fabien Pitard, Toulouse (FR); Jerome Chaptal, Toulouse (FR); Matthieu Aribert, Toulouse (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 0 days.

(21) Appl. No.: 14/154,750

(22) Filed: Jan. 14, 2014

(65) Prior Publication Data

US 2014/0200750 A1    Jul. 17, 2014

(30) Foreign Application Priority Data

Jan. 15, 2013    (FR) ...................................... 13 50326

(51) Int. Cl.
| | |
|---|---|
| G06F 7/00 | (2006.01) |
| G06F 19/00 | (2011.01) |
| B64C 19/00 | (2006.01) |
| G01C 23/00 | (2006.01) |
| G08G 5/00 | (2006.01) |

(52) U.S. Cl.
CPC .............. B64C 19/00 (2013.01); G08G 5/0021 (2013.01); *G01C 23/00* (2013.01); *G01C 23/005* (2013.01); *G08G 5/0004* (2013.01); *G08G 5/0008* (2013.01); *G08G 5/0013* (2013.01); *G08G 5/0017* (2013.01); *G08G 5/0026* (2013.01)

(58) Field of Classification Search
CPC .... G01C 23/00; G01C 23/005; G08G 5/0004; G08G 5/0008; G08G 5/0013; G08G 5/0017; G08G 5/0021; G08G 5/0026; B64C 19/00
USPC ......................................................... 701/3, 14
See application file for complete search history.

(56) References Cited

U.S. PATENT DOCUMENTS

| | | | |
|---|---|---|---|
| 4,642,775 A * | 2/1987 | Cline et al. ..................... 701/528 |
| 7,177,939 B2 * | 2/2007 | Nelson et al. ................... 709/230 |
| 8,442,751 B2 * | 5/2013 | Kimberly et al. .............. 701/120 |
| 2002/0111720 A1 * | 8/2002 | Holst et al. ........................ 701/3 |
| 2005/0171653 A1 * | 8/2005 | Taylor .............................. 701/13 |
| 2007/0219676 A1 * | 9/2007 | Allen et al. ........................ 701/3 |
| 2008/0059005 A1 * | 3/2008 | Greiner et al. ..................... 701/1 |
| 2008/0119972 A1 * | 5/2008 | Peyrucain et al. .............. 701/14 |
| 2008/0249675 A1 * | 10/2008 | Goodman et al. .............. 701/16 |
| 2009/0138871 A1 * | 5/2009 | Kimberly et al. ............. 717/173 |
| 2009/0319096 A1 * | 12/2009 | Offer et al. ......................... 701/2 |
| 2010/0100887 A1 * | 4/2010 | Beltrand ........................ 718/104 |
| 2010/0131149 A1 * | 5/2010 | Saugnac et al. .................. 701/33 |
| 2011/0166772 A1 * | 7/2011 | Ferro et al. ..................... 701/120 |
| 2012/0277936 A1 | 11/2012 | Kumar et al. |
| 2014/0282038 A1 * | 9/2014 | Royster et al. ................. 715/738 |

OTHER PUBLICATIONS

French Search Report, Oct. 11, 2013.

* cited by examiner

*Primary Examiner* — Calvin Cheung
*Assistant Examiner* — Angelina Shudy
(74) *Attorney, Agent, or Firm* — Greer, Burns & Crain, Ltd.

(57) ABSTRACT

A piloting system including a performance functions server which is linked to all the computers of the piloting system, which hosts all the performance functions of the piloting system and which is able to supply the results of performance functions to at least said computers of the piloting system.

10 Claims, 1 Drawing Sheet

SYSTEM FOR PILOTING AN AIRCRAFT PROVIDED WITH A PERFORMANCE FUNCTIONS SERVER

CROSS-REFERENCES TO RELATED APPLICATIONS

This application claims the benefit of the French patent application No. 1350326 filed on Jan. 15, 2013, the entire disclosures of which are incorporated herein by way of reference.

BACKGROUND OF THE INVENTION

The present invention relates to a system for piloting an aircraft, namely a system that makes it possible to implement various functions making it possible to help the pilot perform the piloting of the aircraft and to keep track of the flight, notably comprising means for performing computations and supervision and for transmitting alerts. This piloting system includes a plurality of computers which use pre-recorded data of aeronautical type and more particularly performance data.

Currently, computers using performance data also host various performance functions.

In the context of the present invention:
performance data is understood to mean tables of data representing parameters of the aircraft (aerodynamics, engines etc.) that are used for a computation of flight mechanics, referred to as performance computation;
performance computation is understood to mean a computation of flight mechanics illustrating the behaviour of the aircraft and using performance data; and
performance functions is understood to mean the set of performance computations and readings of performance data, the results of which directly serve the pilot and/or systems of the aircraft. The information generated by these performance functions, which may be transmitted to user means (or systems), are hereinafter called "performance function results" and represent the results of performance computations and/or the direct restoring of information read in performance data.

It is known that modern aircraft possess many on-board functions using their own performance databases and their own performance computation modules. These performance data and computations are present in various systems, such as flight preparation tools, flight control computers, and systems for example of flight management, of FMS (Flight Management System) type, or of warning, of FWS (Flight Warning System) type.

In the current architecture, each database and each performance computation tool are ideally suited to the function of the aircraft for which they have been developed (complexity, format, development quality or DAL (Design Assurance Level)) in accordance with the aeronautical standard DO-178B), precision).

Due to the way they are constructed the computers hosting these various functions are independent and can therefore be developed and validated independently from each other.

This conventional dispersed and multiple architecture leads to drawbacks where performance functions are concerned, and particularly:
redundancy of data leading to a redundancy of tasks and of tools for the development, validation and delivery of these data.
Indeed, the current architecture presents a redundancy of databases and performance algorithms leading to a large workload for developing, validating and providing these various elements in the desired formats;
redundancy of computations and data on board the aircraft, which can lead to a difference in result for one and the same parameter.

Thus, when preparing a mission, several computation systems can be called on to compute the same parameters under the authority of the crew. However, the databases and the requirements in terms of precision and computation time being different for each of these systems, the development of these parameters is therefore different. This has the consequence of supplying different results for one and the same parameter;
redundancy of performance data and computations leading to a redundancy of development and validation of computers.

Each computer has its own cycle of development and validation. This leads to a redundant phase of validation where performance functions are concerned; and
performance data and computations already existing in a computer but not usable by another, leading to a redevelopment of this same function in this other computer.

When one desires to establish a new function in a given computer (in order to use functions already present in the computer in question), it may be necessary to install it in another computer, due to a lack of remaining available resources. This limitation leads to duplicating or redeveloping a set of underlying functions, present on a saturated computer.

SUMMARY OF THE INVENTION

The present invention relates to a system for piloting an aircraft, including a plurality of computers using the results of performance functions, which makes it possible to remedy the aforementioned drawbacks due to the conventional dispersed and multiple architecture.

With this aim, according to the invention, said piloting system is remarkable in that it includes, in addition to said computers using the results of performance functions, a single on-board performance functions server:
which is linked to all said computers of the piloting system;
which hosts all the performance functions of said piloting system;
which comprises:
at least one performance database which stores tables of performance data;
performance computation means which perform all the performance computations; and
a unit for managing the operations of the performance functions server; and
which is able to supply the results of performance functions to computers, called client computers, and to at least all of said computers of the piloting system.

Thus, the architecture in accordance with the present invention of the piloting system, as mentioned above, makes it possible to centralize data and performance computations (at the level of the performance functions server) and to make them available, notably to each computer (called client computer) which is linked to said performance functions server.

This new, centralized and simplified architecture presents, notably, the following advantages:
due to its hosting all the performance functions in a single system (the performance functions server), it makes it possible to avoid redundancy of development and of validation of these functions;

the provision of these performance functions (notably computations) to any computer that desires it;

a consistency between the results of the performance functions (notably computations), obtained for requests sent by various computers; and a capacity to evolve. To satisfy any new development need of an aircraft function, calling on performance computations, the functions already present in the performance functions server can be used again.

Advantageously:

at least one of said client computers comprises means for generating a request, via which it requests particular results of performance functions, and for communicating it to said performance functions server; and said performance functions server comprises means for processing a received request, for generating corresponding performance computations and at least for communicating the results to the client computer transmitting the request.

Furthermore, advantageously, said system includes means for enabling the reception by the performance functions server of current values relating to the aircraft or to the environment in which it evolves (the weather forecast for example).

Moreover, advantageously, said performance functions server performs performance functions (performance computations or reading of performance data):

either in response to a request;

or on its own initiative, as a function of received current values.

Furthermore, advantageously, said performance functions server:

can communicate the results of performance functions servers in a constant stream so that they can be directly consulted by said client computers; and/or includes means for recording the results of performance functions, which can subsequently be communicated.

Thus, said performance functions server is capable of transmitting, in response to a current request, the results of functions or computations of performance that it has performed in response to a prior request, and which have been recorded, if it considers that they are still valid.

Furthermore, advantageously, said piloting system comprises a data transmission network, of usual type, by way of which the performance functions server is linked to at least said computers of the piloting system. In this case, advantageously, said piloting system includes means enabling it to link to said data transmission network (and thus to said performance functions server via this network) at least one computer external to said piloting system, which becomes a client computer.

Computers external to the piloting system can be computers installed on the aircraft and forming a part of other systems of said aircraft. It can also be a portable computer or any other means (external to the aircraft), particularly of open world type, which is available to an operator and notably to a pilot of the aircraft.

The present invention furthermore relates to an aircraft, in particular a transport airplane which is equipped with a piloting system, such as that mentioned previously.

BRIEF DESCRIPTION OF THE DRAWINGS

The figures in the appended drawing will make it possible to understand how the invention can be produced. In these figures, identical reference numbers denote similar elements.

DETAILED DESCRIPTION OF THE PREFERRED EMBODIMENTS

Figure 1:
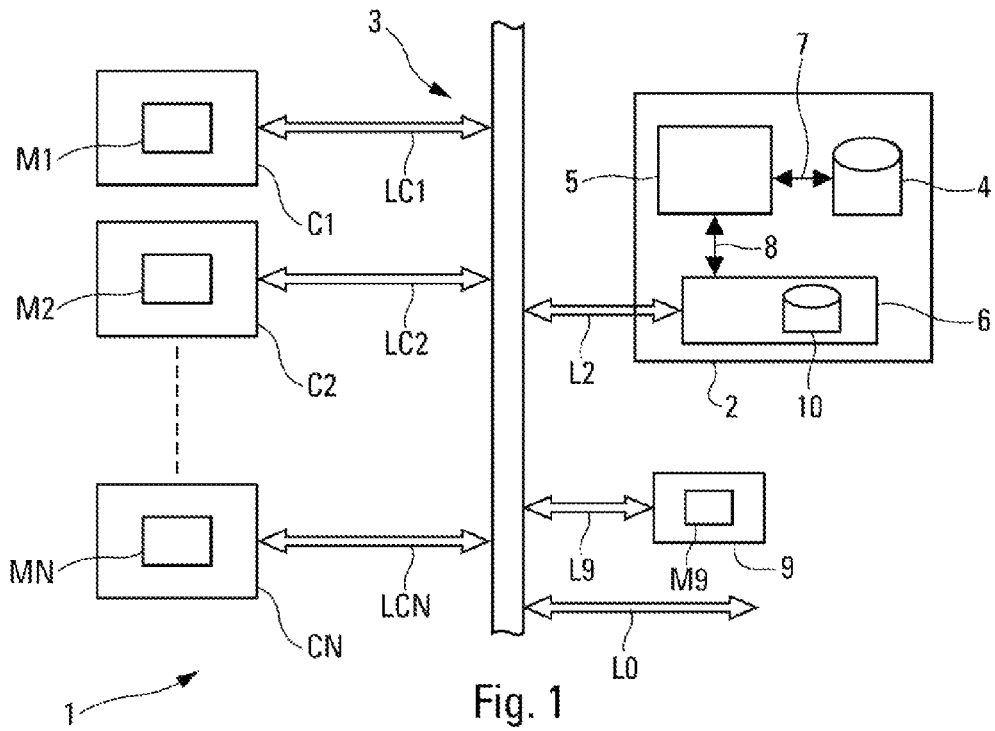
FIG. 1 is the block diagram of a piloting system of an aircraft, making it possible to illustrate the invention.

The system 1 illustrating the invention and shown schematically in FIG. 1 is a piloting system of an aircraft (not shown), in particular of an airplane and notably a transport airplane, namely a system that is capable of implementing various functions making it possible to help the pilot to perform the piloting of the aircraft and to keep track of the flight.

This piloting system 1 notably includes a plurality of usual computers C1, C2, ... CN, N being an integer greater than 2, which use pre-recorded data and more particularly performance data.

According to the invention, said piloting system 1 includes, moreover, a single performance functions server 2 which is on board the aircraft and which notably exhibits the following characteristics:

it is linked to all said computers C1 to CN of the piloting system 1, preferably by a usual data transmission system or network 3 of the aircraft, in particular of AFDX or Ethernet type, as illustrated by the double links LC1 to LCN and L2 in FIG. 1;

it hosts all the performance functions of said piloting system 1; and it is able to supply performance function results to computers, called client computers, and to at least all of said computers C1 to CN of the piloting system 1.

To do this, said performance functions server 2 comprises:

at least one performance database 4 which is an entity of static memory type. This performance database 4 stores a great number of tables of usual performance data, i.e., data tables showing aircraft parameters (aerodynamics, engines, etc.) which are used for usual flight mechanics, computations, referred to as performance computations;

performance computation means 5 which perform all the performance computations, i.e., flight mechanics computations illustrating the behaviour of the aircraft and using said performance database 4 to which said means 5 are linked by way of a link 7. The means 5 contain all the performance computation functions, low and high speeds, able to be used on the aircraft in connection with the piloting system 1; and a unit 6 for managing the performance functions server 2, which is linked to the link L2 and which is linked by way of a link 8 to said means 5.

Said management unit 6 comprises the software of the performance functions server 2. It is in charge of receiving requests from the various client computers and providing them with the requested information, which has been provided using the performance computation means 5 and the database(s) 4 of said performance functions server 2.

This performance functions server 2 therefore contains all the data as well as all the computation modules related to the performances.

Also, as indicated above, said performance functions server 2 makes its data and the performance functions results, particularly the performance computations, available to all the computers (in particular C1 to CN) to which it is linked.

This makes it possible to remove redundancies of data tables and performance computations existing in the conventional architecture, and to ensure a consistency of results between the various computers C1 to CN using these data.

Furthermore, said piloting system 1 includes usual means making it possible to link at least one computer 9 external to said piloting system 1 to said data transmission network 3, as illustrated by a link L9.

This computer 9 external to the piloting system 1 is thus linked to said performance functions server 2 and becomes a client computer of the latter. This computer 9 can be a computer installed on the aircraft and forming a part of other systems of said aircraft. It can also be a portable computer, notably of open world type, or any other means that is external to the aircraft (of non-avionic type) and which is available to an operator and notably to a pilot of the aircraft.

The piloting system 1 thus includes means, notably, the network 3, which authorize the connection of external (not on-board) tools or of an on-board computer which can have an operating mode similar to any other client computer.

Furthermore:
- the client computers C1 to CN and 9 comprise means M1 to MN and M9 for generating a request and communicating it to said performance functions server 2; and
- said performance functions server 2 comprises the management unit 6 for processing a received request, the means 5 for generating (using the base 4) information requested by the request, and the management unit 6 for communicating this information (or performance functions results) to the client computer transmitting the request.

Said performance functions server 2 performs performance computations:
- following a request; or
- on its own initiative, as a function of current values of parameters of the aircraft or of the environment in which it evolves (for example the weather forecast), received for example by way of the network 3 that receives them, in turn, via a link L0 (FIG. 1).

Furthermore, said performance functions server 2 can communicate the results of performance functions in a constant stream, i.e., in the form of a stream of results communicated in a repetitive manner via the network 3, in such a way that they can be directly consulted by the client computers, at any time.

Moreover, said performance functions server 2 also includes usual means 10, namely a dynamic memory entity, which are for example incorporated into the management unit 6, for storing the results of performance computations that the means 5 have performed. Thus, the performance functions server 2 can also make the results of performance computations, previously stored in the means 10, available to the client computers in the form of a stream or following a request, without having to repeat these computations, and this for as long as it considers that these results exhibit a sufficient degree of validity, notably as a function of the time elapsed since the performance of the computations and of the type of parameter being considered.

The performance functions server 2, and notably the management unit 6, can also compute certain parameters automatically and notably make them available in the form of a stream.

Thus the performance functions server 2 can, in particular, perform the following operations:

A) make available to each of the client computers C1 to CN and 9 results of performance computations performed based on requests (sending of a request for a performance function associated with a set of inputs). The performance functions server 2 can, in this case, use current inputs of the aircraft for performing the computation;

B) make available to each of the client computers C1 to CN and 9 previously obtained results based on performance computations performed on the basis of a previous request (i.e., without making any new computations); and C) make available to each of the client computers C1 to CN and 9 results of performance computations in a constant stream. These results can be consulted at any time. These results can either be computed on the initiative of the performance functions server 2, or be the result of previous requests transmitted by any one of the client computers.

Figure 2:
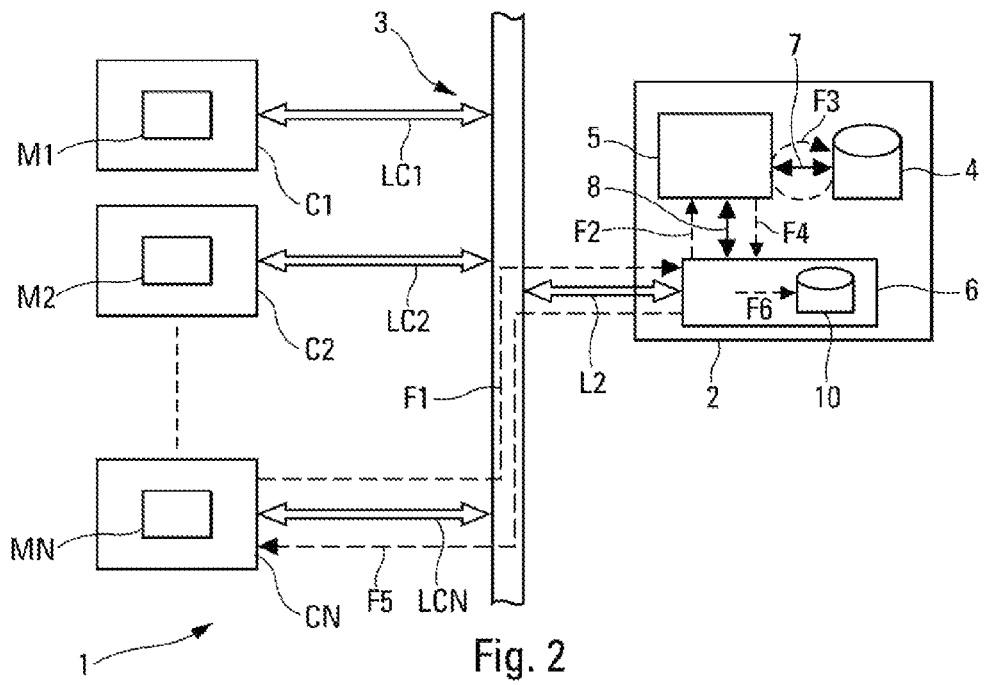
FIG. 2 is the block diagram of a piloting system of an aircraft, making it possible to illustrate an example of processing of a request.

Below is an illustration, with reference to FIG. 2, of the operation of the performance functions server 2 during the implementation of a particular request transmitted by a client computer CN. This request can for example pertain to the computation of take-off speeds of the aircraft.

In this example:
- the computer CN develops (notably using its means MN) the requests necessary for the recovery of the desired parameters. The local communications module sends these requests for the attention of the performance functions server 2 via the network 3 (and the associated links LCN and L2), as illustrated by an arrow F1;
- the unit 6 for managing the performance functions server 2 receives these requests and asks the computation means 5 (as illustrated by an arrow F2) to perform the appropriate performance computations;
- the computation means 5 implement these computations using the tables of data stored in the database 4, as illustrated by an arrow F3, and they transmit the results to the management unit 6 (arrow F4); and
- the performance functions server 2 sends these results to the client computer CN (arrow F5) as response to the request, and also stores these results in the memory 10 (arrow F6) so that it can subsequently provide them to other computers if necessary.

The piloting system 1 thus notably exhibits the following advantages:
- due to the hosting in a single system (the performance functions server 2) of all the performance functions, it makes it possible to avoid redundancy of development and validation of these functions. Additionally, it allows them to be made available to all the client computers C1 to CN and 9;
- the provision of the performance computations to any client system that desires it, on request or by direct consultation, enables each client computer to use the existing performance functions, or to consult a stream of results generated in real time. Additionally, an external (non-avionic) computer, for example the computer 9, can be connected to the performance functions server 2, as a client computer, in order to use its resources;
- consistency between the results of performance computations obtained for requests sent by different computers; and
- capacity to evolve. Any new need for a development of an aircraft function making use of performance computations can use the functions already present in the performance functions server 2.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A piloting system for piloting an aircraft, including a plurality of client computers using results of performance functions, comprising:
   a single on-board performance functions server:
   which is linked to all of said client computers of said piloting system;
   which hosts all of the performance functions of said piloting system;
   which further includes:
   at least one performance database which stores tables of performance data;
   a performance computation unit operably coupled to said performance functions server, said performance computation unit performing all of the performance computations; and
   a managing unit operably coupled to said s performance computation unit, said managing unit managing the operations of the performance functions server; and
   which is configured to supply the results of performance functions to at least one of said client computers of said piloting system,
   wherein said performance functions server automatically communicates the results of performance functions in a constant stream so that the results are directly consulted by at least one of said client computers without causing said performance functions server to repeat the performance functions by removing redundancy of related data and performance algorithm computations for establishing consistency of the results of performance functions.

2. The piloting system according to claim 1, wherein
   at least one of said client computers includes a request generator which generates a request, via which said at least one of said client computers requests particular results of performance functions, and for communicating said at least one of said client computers to said performance functions server; and
   said performance functions server includes a request receiver which processes a received request, for generating corresponding performance functions and at least for communicating the results to said client computer transmitting the request.

3. The piloting system according to claim 1, further including an enabler which enables a reception by the performance functions server of current values relating to the aircraft.

4. The piloting system according to claim 3, wherein said performance functions server automatically performs performance functions as a function of received current values.

5. The piloting system according to claim 1, wherein said performance functions server includes a recorder which records the results of performance functions, which said performance functions server has performed.

6. The piloting system according to claim 1, wherein said performance functions server is configured to transmit, in response to a current request, the results of performance functions that said performance functions server has performed in response to a prior request.

7. The piloting system according to claim 1, further comprising a data transmission network by way of which the performance functions server is linked to at least one of said client computers of the piloting system.

8. The piloting system according to claim 7, further comprising a network which enables the piloting system to link to said data transmission network at least one computing device external to said piloting system as one of said client computers.

9. The piloting system according to claim 1, wherein the results of performance functions are considered by at least one of said client computers based on a factor exhibiting a predetermined degree of validity as a function of a time elapsed.

10. An aircraft having a piloting system for piloting an aircraft, including a plurality of client computers using results of performance functions, comprising:
    a single on-board performance functions server:
    which is linked to all of said client computers of said piloting system;
    which hosts all of the performance functions of said piloting system;
    which further includes:
    at least one performance database which stores tables of performance data;
    a performance computation unit operably coupled to said performance functions server, said performance computation unit performing all of the performance computations; and
    a managing unit operably coupled to said performance computation unit, said managing unit managing the operations of the performance functions server; and
    which is configured to supply the results of performance functions to at least one of said client computers of said piloting system,
    wherein said performance functions server automatically communicates the results of performance functions in a constant stream so that the results are directly consulted by at least one of said client computers without causing said performance functions server to repeat the performance functions by removing redundancy of related data and performance algorithm computations for establishing consistency of the results of performance functions.

* * * * *